United States Patent [19]

Smith

[11] Patent Number: 4,485,015

[45] Date of Patent: Nov. 27, 1984

[54] FILTRATION UNIT

[76] Inventor: Norman H. Smith, 3609 SW. Juneau St., Seattle, Wash. 98126

[21] Appl. No.: 451,879

[22] Filed: Dec. 21, 1982

Related U.S. Application Data

[63] Continuation-in-part of Ser. No. 136,309, Apr. 1, 1980, abandoned.

[51] Int. Cl.³ .............................................. B01D 23/20
[52] U.S. Cl. .................................... 210/455; 210/472; 210/474
[58] Field of Search ......................... 210/455, 472–479

[56] References Cited

U.S. PATENT DOCUMENTS

| | | | |
|---|---|---|---|
| 3,295,686 | 1/1967 | Krueger | 210/474 X |
| 3,334,574 | 8/1967 | Douglas | 210/474 X |
| 3,819,055 | 6/1974 | Skinner | 210/476 X |
| 4,214,993 | 7/1980 | Forsythe | 210/455 X |

Primary Examiner—Thomas Wyse
Attorney, Agent, or Firm—Seed and Berry

[57] ABSTRACT

An integral spacer formed as part of a filtration column frictionally engages a sample container and permits air to escape from the container as it is filled. One embodiment of the filtration column has a series of spaced-apart projecting wedges around its lower edge which frictionally engage the rim of a sample cup or container, such as a test tube, to provide air passages for the air to escape. Another embodiment of the filtration column has an integral, downwardly depending cap which is spaced away from the rim portion of the sample cup by a series of internal projections which contact the rim of the sample cup and provide air passages between the sample cup rim and the depending cap.

6 Claims, 8 Drawing Figures

FIG. 1
FIG. 2
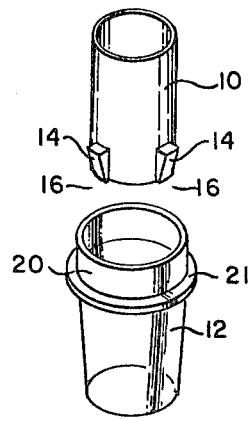
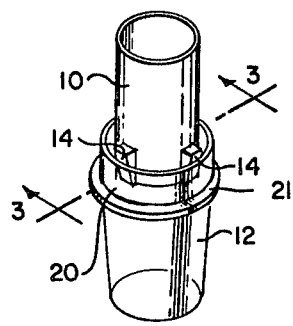
FIG. 4
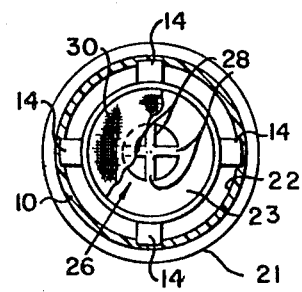
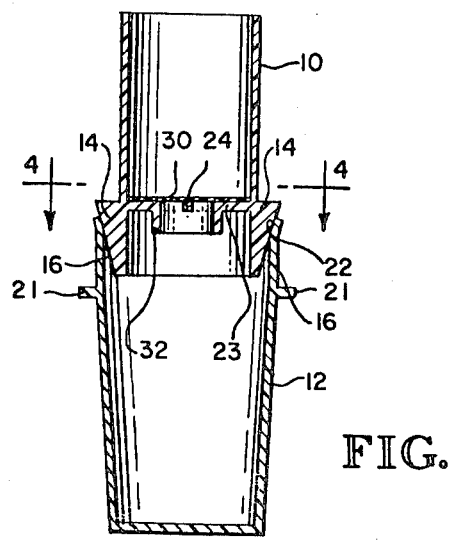
FIG. 3

U.S. Patent    Nov. 27, 1984    Sheet 2 of 2    4,485,015
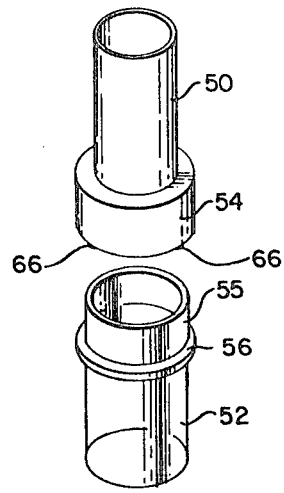
FIG. 5
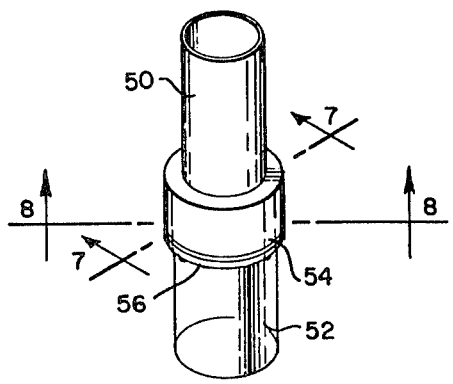
FIG. 6
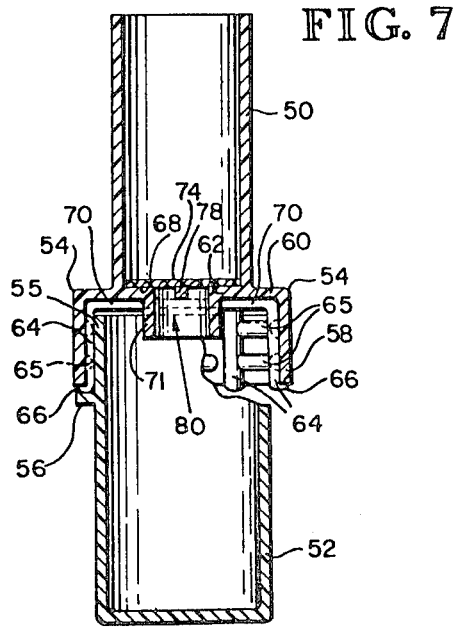
FIG. 7
FIG. 8

FILTRATION UNIT

REFERENCE TO RELATED APPLICATIONS

This application is a continuation-in-part application of U.S. patent application Ser. No. 136,309, filed Apr. 1, 1980.

BACKGROUND OF THE INVENTION

1. Field of the Invention

This invention relates to disposable filter units.

2. Prior Art Relating to the Disclosure

Automatically operated analytic instruments for processing substances such as blood serum require that the blood serum be filtered to avoid clogging of the instrument with coagulated material and other solids. Therefore, individual quantities of blood to be analyzed are poured into disposable filter units and the filtrate is collected in sample cups for further processing. U.S. Pat. No. 3,608,736 describes a disposable filter unit having a downwardly depending cap which fits around the top portion of a sample cup, making it hard to determine the level of filtered blood serum in the cup. Since the interior surface of the cap frictionally engages and seals against the outside surface of the sample cup, small holes are provided directly through the wall of the cap for letting air escape from the cup as it is filled. A disadvantage of that type of cap is that it will only fit a specimen cup having a certain outside diameter. The outside diameters of sample cups produced by different manufacturers vary considerably, even if their inside diameters are the same. The end result is that different sizes of filtration units are required to be manufactured and stocked for each sample cup type. Obviously, this is inefficient and expensive. Prior disposable filtration units have a relatively small discharge hole at the bottom of the column so that the filter material, such as thin sheets of filter paper, is adequately supported by the column.

Many other biological substances are first filtered prior to being analyzed or processed in containers such as test tubes or the like. The filtering equipment is sometimes complicated and expensive. For example, a hollow cylindrical collection tube has a filter located at its lower end and a seal positioned around the outside of its lower end. The seal slides along the inside surface of a larger cylindrical test tube containing the fluid substance to be filtered. As the collection tube is pushed down into the larger test tube, pressure on the confined fluid forces fluid up through the filter and up into the collection tube. The filtered fluid is then transferred from the collection tube to a test tube or the like for analysis or further processing. Obviously, this apparatus is expensive to manufacture, requires an operator's time, and involves transferring fluids to an intermediate container, that is, the collection tube, increasing the possibility of contamination. Pressurization of the fluid being filtered may force undesired substances through the filter media.

SUMMARY OF THE INVENTION

To overcome these and other deficiencies of the prior art, it is an object of this invention to provide an improved, inexpensively fabricated, disposable filtration unit.

It is another object of this invention to provide a disposable blood filtration unit which permits air to easily escape from a sample cup being filled.

It is another object of this invention to provide one embodiment of an improved disposable filtration unit which accommodates a range of sample cups having varying dimensions and which permits air to easily escape and the fluid level in a specimen cup to be easily seen.

It is another object of this invention to provide another embodiment of a filtration unit having a cap portion which is spaced from the sample cup to provide passages for the escape of air from the specimen cup.

It is another object of the invention to provide a filtration unit which includes a support for a filter so that a larger discharge area is available.

It is another object of this invention to provide a disposable filtration unit having a baffled end cap which surrounds the rim and exterior surface wall of collection sample cup so that air venting from the sample cup bends substantially 180° in two elbow bends and has its flow disrupted by the vertical and horizontal baffles so that droplets of filtrate are removed from the air. The vertical baffles may include wedge-shaped portions to improve the frictional interconnection.

In accordance with these and other objects of the invention, an improved disposable filtration unit is provided which provides a frictional interfit between a filtration column and a sample cup. The filtration column is spaced from the sample cup to provide passages for the escape of air from the sample cup as it is filled by filtrate discharged from the column. One embodiment of the invention utilizes external wedge-shaped projections at the lower end of the filtration column which frictionally engage a sample cup and accommodate a range of cup or test tube sizes. A second embodiment of the invention uses an end cap integral with the filtration column wherein a plurality of projections space the cap from the top edge and sides of a sample cup, providing escape passages for air as the sample cup is filled. A spider structure is positioned across the filtration column for supporting a filter media to increase the effective discharge area of the filtration unit.

BRIEF DESCRIPTION OF THE DRAWINGS

FIG. 1 is an exploded isometric view of one embodiment of a disposable filtration unit and a sample cup;

FIG. 2 is an assembled isometric view of the one embodiment of a disposable filtration unit interfitting with the sample cup;

FIG. 3 is a sectional view of the filtration unit and sample cup taken along section line 3—3 of FIG. 2;

FIG. 4 is a partially cut-away, sectional view taken along section line 4—4 of FIG. 3;

FIG. 5 is an exploded isometric view of a second embodiment of a filtration column having a downwardly depending cap;

FIG. 6 is an assembled isometric view of the second embodiment of the filtration column and specimen cup as shown in FIG. 5;

FIG. 7 is a section view of the assembly of FIG. 6 taken along section line 7—7; and FIG. 8 is a section view of the assembly of FIG. 6 taken along section line 8—8.

DETAILED DESCRIPTION OF THE PREFERRED EMBODIMENTS

Referring to FIGS. 1 and 2, the lower end of a filtration column 10 fits within the mouth of a typical sample cup 12. Note that the filtration column 10 also fits within the mouth of a variety of containers, such as test tubes, and the invention is not restricted to use with the sample cup 12, which is exemplary. A plurality of wedge-shaped projections 14, having angled external surfaces 16 which angle downwardly and inwardly along the lower outside surface of the filtration column 10, wedge-fit within a range of sample cup sizes. The filtration column 10 is an elongated cylindrical body inexpensively formed from a molded plastic material. The wedges 14 longitudinally extend along the outer surface of the cylindrical filtration column and are integrally molded with the column. As shown in FIG. 3, the sample cup has a circular rim 20 formed around the mouth opening at the top of the cup. Below the rim 20 of the sample cup 12 is formed a radially extending, annular flange 21 which may serve as a locating member for placement of the cup in an analytic machine. The flange 21 also serves as a fill indicator for the cup. The surfaces 16 of the wedges 14 engage the interior surfaces 22 of the rim 20 and frictionally join the filtration column 10 to the sample cup 12. A variety of cup sizes having different mouth diameters are accommodated by the variable configuration of the wedge faces 16 formed on the column. Thus, one size of the filtration column 10 is used with a range of sample cup sizes having different mouth sizes. Note that what has been said for the sample cup also applies to other containers, such as test tubes and the like.

The wedge portions 14 not only frictionally interfit with the sample cup 12, but also space the filtration column 10 away from the interior surface of the rim of sample cup 12 so that air passages are provided between the lower external surface of the filtration unit 10 and the interior surface 22 of the sample cup rim 20. These passages permit air to escape from the sample cup as the sample cup is filled with filtrate.

As shown in FIG. 4, a transversely positioned partition 23 extends across the bore of the column's interior away from the lower end of the column 10 and provides a chamber above the partition for holding the substance to be filtered. A central aperture 24 is formed in the partition 23 and the aperture 24 is spanned by a spider structure 26 having a plurality of radially extending arms 28. The top surface of the spider 26 is coplanar with the interior surface of the partition 23, providing surfaces against which a sheet of filter paper 30 lies as shown in FIGS. 3 and 4. The spider 26 provides a relatively large discharge area for the filtration column 10 while providing support for the filter paper overlying the discharge opening defined by the aperture 24. The arms 28 of the spider 26 define a plurality of passages for filtrate, which is gravity fed through the filter 30. A downwardly depending, cylindrical discharge nozzle portion 32 is formed adjacent the ends of the spider arms 28 and directs the filtrate into the interior of the sample cup.

In operation, the filtration column 10 is joined to a sample cup 12 or some other container, such as a test tube, by coaxially placing the lower end of the filtration column 10 within the rim 20 of the sample cup 12 or container. The filtration column 10 is pushed downwardly toward the sample cup 12 so that the faces 16 of the wedges 14 engage the up rim 20 along its interior surface 22. The filtration column 10 is pushed until the wedge faces 16 are in tight frictional engagement with the interior surface 22 of the sample cup 12. FIGS. 3 and 4 show a piece of filter paper 30 positioned along the top surface of the partition portion 23 of the filtration column 10. The substance to be filtered, for example, blood, is poured into the open top of the chamber formed in the hollow interior of the filtration column 10 above the partition 23. The blood flows by gravity through the filter paper 30, which collects undesired clotted material and other substances from the blood. The filtrate is discharged from the filter paper through a large area nozzle portion 32 of the column into the interior of the cup 12, where it is collected. The air within the sample cup 12 is displaced by the filtrate and is forced out of the cup through the air passages provided between the lower end of the filtration column 10 and the interior surface 22 of the rim 20 of the sample cup 12, permitting the air to be easily vented. The spider structure 26 permits a relatively large area of the filter paper to be used for filtering and provides a large discharge cross-sectional area for the column. Note again that a range of diameters for the sample cup 12 or other container is easily accommodated by the variable contact surface of the wedge faces 16 and that air is readily discharged from the sample cup or other container with this configuration. The lower end of the column fits inside the sample cup rim and allows an operator to easily determine the level of filtrate within the sample cups with respect to the flange 21 formed on the exterior of a transluscent sample cup 12.

ANOTHER EMBODIMENT

FIGS. 5 and 6 show another embodiment of the invention. Another filtration column 50 joins to a sample cup 52 similar to the sample cup 12 described above. The filtration column 50 is an elongated, hollow cylindrical tube, preferably inexpensively molded from a plastic material. At the lower end of the filtration column 50 is formed an integral depending cap 54 which fits over the rim 55 at the upper end of the hollow cylindrical sample cup 52, but the cap 54 does not seal against the cup. The cup 52 has a radially extending annular flange 56 extending therefrom which serves both as a locating stop for the cup 52 and as a fill indicator line for the cup 52.

Referring to FIGS. 7 and 8, the cap 54 includes a cylindrical depending rim 58 which projects downwardly from the periphery of a flange 60 radially extending from the bottom 62 of the filtration column 50. A series of longitudinally extending ribs 64 are formed to space the interior of the cap 54 away from the exterior surface of the top rim 55 of sample cup 52. Depending on the length of the rim 55 of the cup, the lower projecting ends 66 of the ribs 64 engage the upper surface of the flange 56 and space the cap 54 away from the flange 56. The upper interior surface 68 of the cap portion 54 has a plurality of elongated, downwardly projecting horizontal ribs 70 positioned thereupon which extend from the upper ends of the longitudinal ribs 66 toward a downwardly depending nozzle portion 71 of the filtration column 50. Depending on the length of the rim 55 of the cup, the horizontal ribs 70 space the cap 54 away from the top edge of the rim 55 of the sample cup 52. The longitudinal ribs 64 and the horizontal ribs 70, if necessary, space the interior surfaces of the cap 54 from the exterior surfaces of the sample cup 52 and provide air passages between the interior surfaces of the cap 54 and the underlying portions of the sample cup 52. A series of circumferential ribs 65 are formed around the cylindrical interior surface of the cap. These ribs also frictionally contact the cup and, during manufacture of the cup, are used to remove the filtration unit from the die in which the filtration unit is molded.

As shown in FIGS. 7 and 8, a piece of filter paper 74 overlies the bottom interior surface of the filtration column 50 and is supported by a spider structure 76 having radially extending ribs 78. The spider structure 76 extends across a central aperture 80 formed in the bottom of the filtration column 50 and the filter paper 74 is supported by the top surfaces of the radially extending rib portions 78 with the top surfaces of the ribs 78 are flush with the bottom surface of the column interior. The ribs define a plurality of discharge outlet passages for the column 50 and the spider structure permits a large ccross-section discharge area for the column 50.

Thus, a preferred filtration unit combines a plurality of substantially vertical, longitudinal ribs 64 with a plurality of horizontal ribs 65 circumferentially interspersed between the vertical ribs 64 in two spaced tiers. These ribs 64 and 65 function as baffles to disrupt air flow from the sample cup during filtering and help to knockout essentially all of the filtrate entrained in the air.

In operation, the cap 54 of the filtration column 50 is placed around the rim 55 of the sample cup 52 as indicated in FIG. 7. Dependent upon the length of the cup rim 55, the projections 66 and/or the horizontal ribs 70 may contact the cup, together with the longitudinal ribs 64. Passages are thereby provided for air to escape as filtrate fills the interior of the sample cup 52 and forces air out of the cup and through the passages formed between the interior surface of the cap and the rim 55 of the sample cup.

While particular embodiments of the invention have been shown and described, it should be understood that the invention is not limited thereto since many modifications may be made. It is therefore contemplated to cover by the present application any and all such modifications that fall within the true spirit and scope of the basic underlying principles disclosed and claimed herein.

I claim:

1. A filtration unit for delivering filtered liquid from blood and other human sera to a sample container, which has a transverse rim and a longitudinal external wall surface, comprising:
   (a) a filtration column having a longitudinal axis;
   (b) an end cap fixed to the column and being capable of surrounding an open end of the container so that a longitudinal internal surface of the end cap is substantially parallel to an external wall surface of the container to define an area of overlap between the internal and external surfaces;
   (c) a plurality of spaced, inwardly projecting connecting ribs attached to the internal surface of the end cap
      (1) to frictionally join the column through the end cap to the container by contacting the external wall surface of the container apart from the rim in the area of overlap and
      (2) to form a plurality of passages in the area of overlap, each passge being defined by the external wall surface of the container, a pair of connecting ribs, and the internal surface of the end cap, the passages defining the only air vents for the container when connected to the column; and
   (d) a plurality of horizontal ribs interspersed between the connecting ribs on the end cap in the area of overlap to provide at least one baffle in each passage, wherein the end cap defines a connection between the column and container through which filtered liquid can pass from the column to the container, and wherein, when filtered liquid enters the container, air vents from the container by passing through a passage defined by the connecting ribs, bending substantially 180° in two 90° elbows and flowing downwardly in a passage adjacent the external surface of the container.

2. The filtration unit of claim 1 wherein the connecting ribs are substantially L-shaped to abut the external wall surface of the container with a longitudinal segment of each rib and the rim at the top open end of the container with a transverse segment of each rib.

3. The filtration unit of claim 1 wherein the connecting ribs are spaced around the internal surface of the end cap and extend longitudinally on the column so that each rib is substantially parallel to the longitudinal axis of the column in the area of overlap, thereby being substantially vertical in the portion of the rib which contacts the external wall surface of the container.

4. The filtration unit of claim 3, further comprising a spider transversely positioned across the column and having ribs to support filter media and to define passages for filtered liquid which passes from the column to the container.

5. The filtration unit of claim 4 wherein the spider includes a discharge nozzle for the filtered serum leaving the column into the container.

6. The filtration unit of claim 5 wherein each connecting rib is generally wedge-shaped in the vertically extending portion so that the column is frictionally joined to the container by inserting the open end of the container into the end cap to engage the wedge-shaped ribs.

* * * * *